Sept. 11, 1945. W. W. HECKETHORN 2,384,740
WELDED TUBE CLOSURE MACHINE
Filed Aug. 2, 1943 2 Sheets-Sheet 1

INVENTOR.
WILLIAM W. HECKETHORN
BY
ATTORNEY.

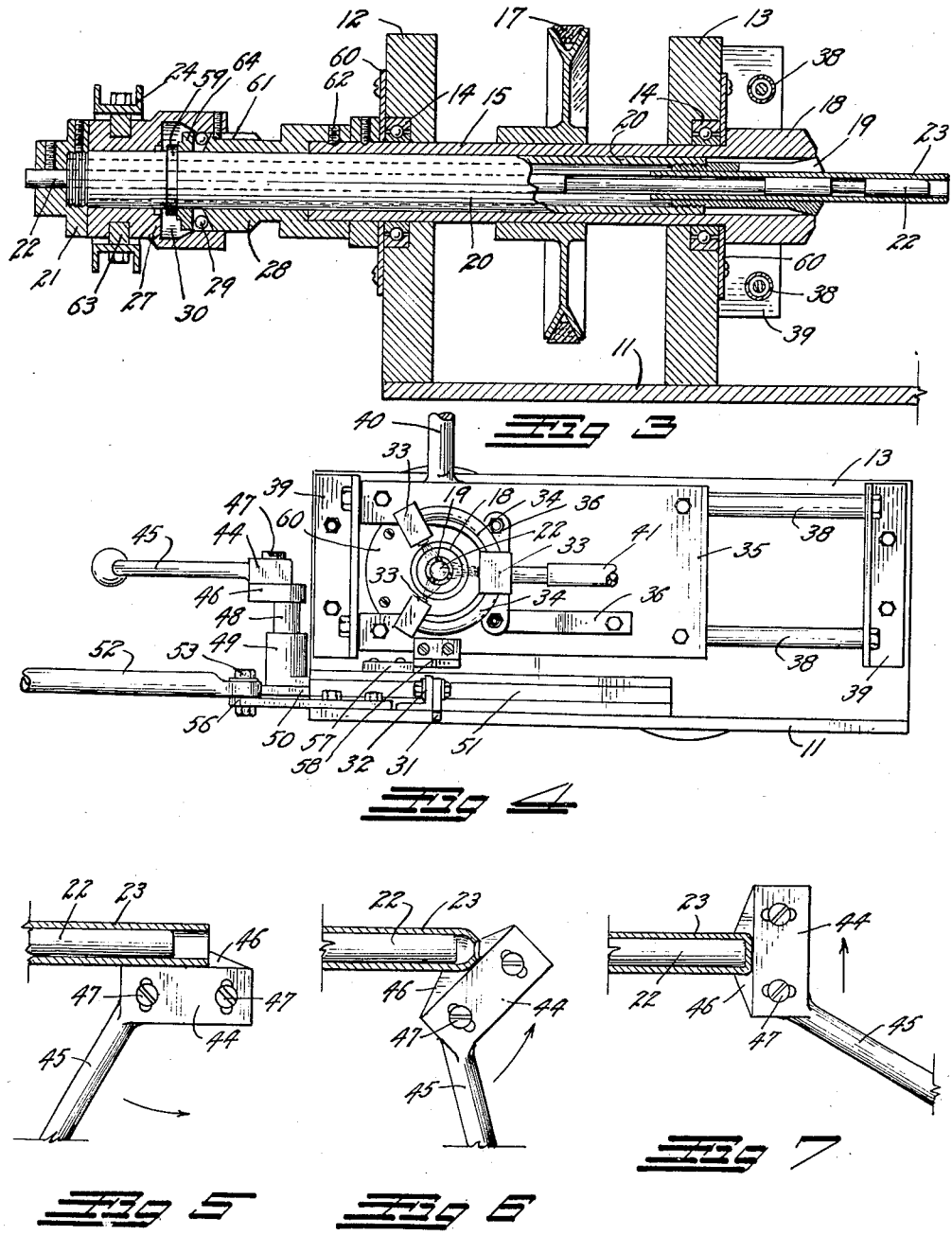

Patented Sept. 11, 1945

2,384,740

UNITED STATES PATENT OFFICE 2,384,740

WELDED TUBE CLOSURE MACHINE

William W. Heckethorn, Littleton, Colo., assignor to Heckethorn Manufacturing & Supply Co., Littleton, Colo., a corporation of Colorado Application August 2, 1943, Serial No. 497,113

5 Claims. (Cl. 78—89)

This invention relates to a machine for closing, sealing, and welding the ends of steel or iron tubes and has for its principal object the provision of a simple and highly efficient machine which will heat the tube extremity at the proper points for efficient bending and welding and thence rapidly and accurately roll the heated extremity inwardly to a homogeneous closure.

Other objects of the invention are: to so construct the device that the heating torches will be automatically moved from the zone of operation during the closing and welding step; to provide means whereby all of the operating equipment will be removed from the heating zone during the heating operation so as to prevent damage to the tools and equipment of the machine; and to provide a highly efficient collet operating device which will quickly and firmly grip the tubing to be welded, rotate the latter during the heating and welding operations, and then release the finished article.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 3 is an enlarged longitudinal section of the collet shaft as employed in the invention;

Fig. 4 is an end view of the machine as it would appear during the heating operation;

Figures 1, 2:
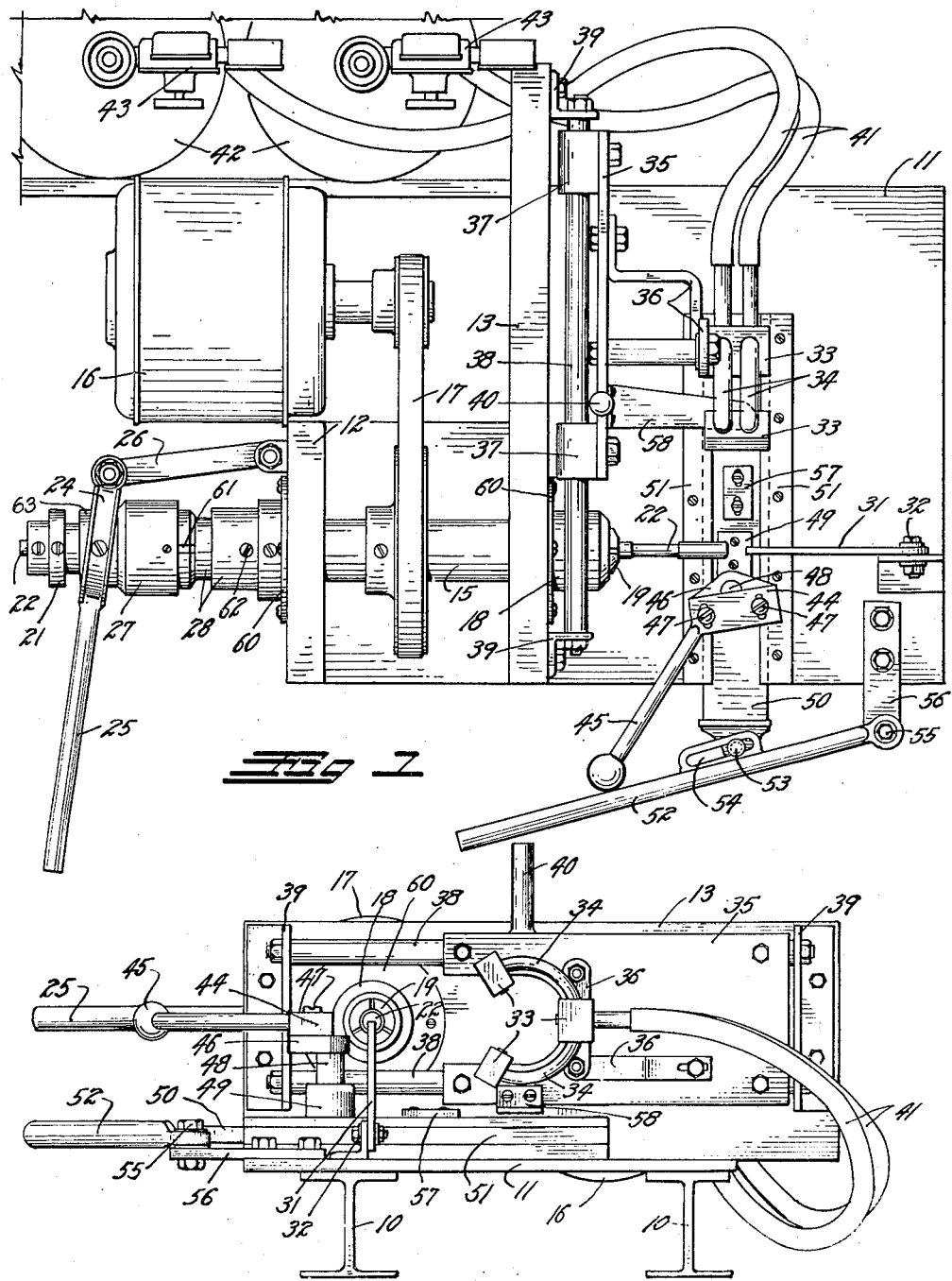
Fig. 1 is a plan view of the improved tube closure device.
Fig. 2 is an end view thereof with the welding torches illustrated removed from the work.

Figs. 5, 6, and 7 are diagrammatic views illustrating the successive steps employed in the rolling and welding of the tube.

The tube to be closed and welded is illustrated at 23. The improved tube closure machine is mounted upon any suitable supporting frame or bed 10, carrying an operating table plate 11. Two upstanding bearing members 12 and 13 arise from the table 11 in parallel relation. The members 12 and 13 carry journal bearings 14 for a hollow collet shaft 15. The shaft 15 is rotated from a suitable electric motor 16 through the medium of a V-belt transmission 17 or in any other desired manner.

The collet shaft 15 terminates at its forward extremity in a collet closing head 18 into which a standard collet 19 is withdrawable. The collet 19 is threaded into the forward extremity of a draw tube 20, the rearward extremity of which is threaded into a set collar 21. The set collar 21 also locks a mandrel bar 22 axially in place. The mandrel bar projects forwardly of the collet 19 to act as the forming mandrel over which the tube 23 is spun or formed. By reciprocating the draw tube 20 forwardly and rearwardly, the collet 19 is caused to alternately grip and release the tube 23.

The reciprocation of the draw tube 20 is accomplished by means of a yoke 24 operated by means of a yoke lever 25, the rearward extremity of which is secured, by means of a link 26, to the bearing member 12. When the lever 25 is swung forwardly, the collet will be opened, and when swung rearwardly, the collet will be closed. The yoke 24 engages a collar 63 which rides in a receiving groove in a clutch hub 27. The clutch hub 27 reciprocates over the extremity of a thrust spool 28. Collet locking balls 29 are mounted between a tapered extremity on the thrust member 28 and a thrust ring 64 which engages an annular shoulder 59 formed on the draw tube 20. A hollowed, taper-ended ball cavity 30 is formed in the clutch hub 27 about the ring 64 and the balls 29.

When the draw bar is in the retracted position of Fig. 3 the balls are forced by the restricted portion of the clutch hub between the tapered end of the thrust spool 28 and the thrust ring 64. This causes the latter to act against the shoulder 59 to draw the draw tube, and through it the collet 19, inwardly into the closing head 18 to close the collet and hold it closed upon the work. When the clutch hub is moved forwardly, the balls move outwardly into the enlarged ball cavity 30 to allow the thrust ring 64 to approach the thrust spool 28. This releases the shoulder 59 and allows the collet to move forwardly to the open position. The outward movement of the draw tube is initiated by the clutch hub which comes into contact with the shoulder 59 on its releasing movement.

The rotation of the collet shaft 15 is transmitted to the thrust spool 28 by means of a key or set screw 62 which secures the two together. The rotation of the thrust spool is imparted to the clutch hub by means of a set screw in the latter which rides in a keyway 61 in the former. The rotation of the draw tube 20 is transmitted to the mandrel bar 22 through the collar 21 which is keyed or attached to both as illustrated in Fig. 3.

A gauge arm 31 is hinged to the table 11 ahead of and in line with the mandrel 22 by a pin or bolt 32 for gauging the projection of the tube 23 to be welded before the latter is gripped by the collet. After the gripping is complete the stop lever 31 is swung out of the way to the position of Fig. 4.

The projecting extremity of the tube 23 is heated to welding temperature at its extremity and to a malleable temperature adjacent the extremity by means of an annular series of welding torches 33 which are supported by curved gas tubes 34. The assembly of torches and gas tubes is adjustably mounted on a vertical slide plate 35 by means of suitable spacers and bracket bars 36. The slide plate is secured to slide fittings 37 which slide along parallel, horizontal guide tubes 38. The guide tubes are supported between suitable fixed spacing angles 39 secured to the side of the bearing member 13. A handle 40 is provided for convenience in sliding the entire torch assembly along the guide tubes 38.

The torches are so positioned, with relation to the slide plate 35, that they may be brought to the proper position over the projecting extremity of the tube 23 to bring the latter to the proper forming and welding temperature. Suitable combustion gases are fed to the torches through flexible supply hose 41 from convenient storage containers 42, through the usual pressure reducing gauge assembles 43.

The actual closing and welding operation is accomplished by means of a rotatable welding block 44 from which an operating handle 45 projects. The block 44 is adjustably mounted upon a rotatable platform 46 by means of clamp screws 47. The platform is formed on the upper extremity of a post 48 which in turn is rotatably mounted on a receiving socket base 49. The socket base 49 is mounted on a slide bar 50 which is slidably mounted in a slide frame 51, which is secured to the table 11 transversely of and below the axis of the mandrel 22. The heighth of the welding assembly is such as to bring the welding block opposite the extremity of the mandrel 22.

The slide bar 50 is reciprocated by manipulation of a pressure lever 52 to which its outer extremity is operatively connected in any desired manner. As illustrated, the extremity of the slide bar terminates in a hinge pin 53 which operates in a slotted fin 54 formed on the lever 52. One extremity of the lever 52 is hingedly mounted on a pivot 55 supported on a projecting bracket 56, extending from the table 11. It can be readily seen that by swinging the lever 52, the slide bar and its supported welding assembly can be reciprocated transversely toward and away from the work. The slide bar 50 carries a contact block 57 positioned to contact a stop arm 58 on the slide plate 35.

The operation of the device is as follows: The motor 16 is started and the torches 33 are lighted. The operator then places an open ended tube 23 over the mandrel 22, and slides it within the opened rotating collet 19. He then brings the extremity of this tube against the gauge arm 31 to accurately gauge its projection and closes the collet by operation of the lever 25 to grip and rotate the tube. He then swings the gauge arm 31 out of the way as shown in Fig. 4 and draws the torches forwardly by means of the handle 40 until the slide plate 35 strikes the forward supporting angle 39 as shown in Fig. 4. This movement causes the stop arm 58 to engage the contact block 57 to push the welding assembly out of the way and bring the torches to a position, as shown in Fig. 4, surrounding the projecting extremity of the tube 23.

The torch flames quickly bring the projecting extremity of the tube to the welding temperature. This temperature is noted by the operator from the first appearance of sparks of burned metal. When this occurs, the operator pushes the pressure lever 52 forwardly to bring the welding block 44 against the side of the heated tube as shown in Fig. 5. This forward movement of the lever 52 causes the contact block 57 to act against the stop arm 58 to push the torches away from the work to the position of Fig. 1. The operator then rotates the lever 45 in the direction of the arrow in Fig. 5 while simultaneously applying pressure to the lever 52. This presses the welding block against the heated extremity of the tube and simultaneously rotates this block around the extremity of the tube so as to fold and spin the rapidly rotating hot metal over the end of the mandrel tube 22 as shown in Fig. 6 and eventually form an accurate and perfect closure thereon as shown in Fig. 7.

The operator then pulls the lever 52 forwardly, to withdraw the welding assembly, and pulls the lever 25 inwardly to release the completed tube. He then removes the latter from the mandrel 22 and repeats the operation on the next successive tube. The motor 16 and the torches 33 operate continuously while the machine is in use.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A machine for closing and welding the extremity of a tube comprising: a rotating mandrel; a tube gripping collet surrounding and rotating with said mandrel to hold the tube thereabout, said tube projecting beyond the extremity of said mandrel; a heating torch; movable means supporting said torch so that it may be brought to a position opposite the projecting extremity of said tube; a rotatable forming block; and movable means supporting said forming block so that it may be brought into contact with and rotated about the heated projecting extremity of said tube; the torch support and the block support each serving to shift the other out of an operative position as it is moved towards an operative position.

2. A machine for closing and welding the extremity of a tube comprising: a rotating mandrel; means for securing said tube about said mandrel with the tube projecting beyond the mandrel; a movable torch support; means for guiding the movement of said torch support transversely of the axis of said mandrel; torches carried by said torch support in a position to surround said projecting extremity of the tube when said torch support is at one extremity of its travel; a slide bar; guide means for guiding said slide bar transversely of the axis of said mandrel; a movable forming block supported by said slide bar in the plane of said projecting extremity; said torch support serving to move the slide bar and shift the forming block away from the mandrel when the torch support is shifted to move the torches to an operative position, lever means for actuating said slide bar to bring said block against said extremity; and means for moving said block to spin said projecting extremity to a closed end.

3. A machine for closing and welding the extremity of a tube comprising: a rotating mandrel; means for securing said tube about said mandrel with an end portion of the tube projecting beyond the mandrel; a movable torch support; means for guiding the movement of said torch support transversely of the axis of said mandrel; torches carried by said torch support in a position to surround the projecting extremity of the tube when said torch support is at one extremity of its travel; a slide bar; guide means for guiding said slide bar transversely of the axis of said mandrel; a rotatable forming block supported by said slide bar in the plane of said projecting extremity; lever means connected with an end of the slide bar for actuating said slide bar to bring said block against the extremity of the tube; means for rotating said block to spin said projecting extremity of the tube and form a closed end; said slide bar and said torch support being engageable with each other to move the block out of an operative position when the torches are moved to an operative position.

4. A machine for closing and welding the extremity of a tube comprising: a rotating mandrel; means for securing said tube about said mandrel with the former projecting beyond the latter; a movable torch support; means for guiding the movement of said torch support transversely of the axis of said mandrel; torches carried by said torch support in a position to surround the projecting extremity of the tube when said torch support is at one extremity of its travel; a slide bar; guide means for guiding said slide bar transversely of the axis of said mandrel; a rotatable forming block supported by said slide bar in the plane of said projecting extremity; lever means for actuating said slide bar to bring said block against said extremity; means for rotating said block to spin said projecting extremity to a closed end; and means on said slide bar for moving said torch support away from said tube as the forming block approaches the projecting extremity.

5. Means for simultaneously rotating and heating the extremity of a tube for welding purposes comprising: a work table; an upstanding bearing member rising from and extending horizontally across said table; a work holder rotatably mounted through said bearing member transversely thereof and adapted to carry a tube with an end portion of the tube projecting from the holder in vertical spaced relation to the table; a movable torch support slidable along said bearing support; torches carried by said support; in position for disposal about the projecting end of the tube when in an operative position; means for guiding said torch support to bring the torches into position to play upon the extremity of said tube; a slide frame mounted on said table longitudinally of the bearing support and transversely of the axis of said tube holder; a slide bar mounted in and guided by said frame; a welding block; means for rotatably supporting said block from said slide bar in the plane of said tube holder; means for forcing said block toward and around the extremity of said mandrel; and means for transmitting movement from said slide bar to said torch support for removing said torches from said projecting end before the latter is approached by said welding block.

WILLIAM W. HECKETHORN.